(12) United States Patent
Lee et al.

(10) Patent No.: US 8,988,795 B2
(45) Date of Patent: Mar. 24, 2015

(54) IMAGING LENS

(71) Applicant: Genius Electronic Optical Co., Ltd., Taichung (TW)

(72) Inventors: Poche Lee, Taichung (TW); Kuo-Wen Chang, Taichung (TW); Long-Sheng Liao, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/493,024

(22) Filed: Sep. 22, 2014

(65) Prior Publication Data

US 2015/0009582 A1    Jan. 8, 2015

Related U.S. Application Data

(60) Division of application No. 14/303,080, filed on Jun. 12, 2014, which is a continuation of application No. 13/013,164, filed on Jan. 25, 2011, now Pat. No. 8,792,187.

(30) Foreign Application Priority Data

Sep. 10, 2010  (TW) ............................... 99130640 A

(51) Int. Cl.
  *G02B 9/34*    (2006.01)
  *G02B 3/02*    (2006.01)
  (Continued)

(52) U.S. Cl.
  CPC ...... *G02B 9/34* (2013.01); *G02B 13/18* (2013.01); *G02B 13/004* (2013.01)
  USPC .......................................... 359/773; 359/715

(58) Field of Classification Search
  CPC ......... G02B 9/34; G02B 13/18; G02B 13/004
  USPC .................................................. 359/715, 773
  See application file for complete search history.

(56) References Cited

U.S. PATENT DOCUMENTS 6,476,982 B1   11/2002  Kawakami
7,453,654 B2   11/2008  Shinohara
(Continued)

FOREIGN PATENT DOCUMENTS

| CN | 101755230 A | 6/2010 |
| KR | 2010-00808866 A | 7/2010 |
| TW | 2012-11614 A | 3/2012 |

OTHER PUBLICATIONS

U.S. Appl. No. 14/302,179, filed Jun. 11, 2014 by Lee et al. (Unpublished).
U.S. Appl. No. 14/303,080, filed Jun. 12, 2014 by Lee et al. (Unpublished).
(Continued)

*Primary Examiner* — William Choi
(74) *Attorney, Agent, or Firm* — Kilpatrick Townsend & Stockton LLP

(57) ABSTRACT

An imaging lens includes plastic-made first, second, third, and fourth lens elements arranged in the given order from an object side to an imaging side. The first lens element has a positive focusing power and is biconvex. The second lens element has a negative focusing power, is biconcave, and has an abbe number not greater than 30. The third lens element has a positive focusing power and has a convex imaging-side surface facing toward the imaging side. The fourth lens element has an imaging-side surface formed with a concave area in a vicinity of an optical axis of the fourth lens element. The imaging lens further includes an aperture stop disposed between the first and second lens elements.

4 Claims, 7 Drawing Sheets

(51) Int. Cl.
  *G02B 13/18*  (2006.01)
  *G02B 13/00*  (2006.01)

(56) References Cited

U.S. PATENT DOCUMENTS

| | | | |
|---|---|---|---|
| 7,466,497 | B2 | 12/2008 | Park et al. |
| 7,864,454 | B1 | 1/2011 | Tang et al. |
| 7,944,627 | B2 | 5/2011 | Sakagami |
| 8,199,418 | B2 | 6/2012 | Chen et al. |
| 8,792,187 | B2 | 7/2014 | Lee et al. |
| 2010/0110563 | A1 | 5/2010 | Nakagawa |
| 2010/0208363 | A1 | 8/2010 | Yasuhiko et al. |
| 2011/0069401 | A1 | 3/2011 | Jo |
| 2011/0075271 | A1 | 3/2011 | Tang et al. |
| 2011/0075272 | A1 | 3/2011 | Yuan et al. |
| 2012/0013998 | A1 | 1/2012 | Tang et al. |
| 2012/0044403 | A1* | 2/2012 | Tang et al. .................... 348/340 |
| 2014/0285910 | A1 | 9/2014 | Lee et al. |
| 2014/0293460 | A1 | 10/2014 | Lee et al. |

OTHER PUBLICATIONS

Non-Final Office Action for U.S. Appl. No. 13/013,164 mailed on Aug. 16, 2012, 7 pages.
Final Office Action for U.S. Appl. No. 13/013,164 mailed on Jan. 9, 2013, 8 pages.
Advisory Action for U.S. Appl. No. 13/013,164 mailed on Mar. 15, 2013, 3 pages.
Non-Final Office Action for U.S. Appl. No. 13/013,164 mailed on Dec. 3, 2013, 7 pages.
Notice of Allowance for U.S. Appl. No. 13/013,164 mailed on Mar. 13, 2014, 8 pages.
Restriction Requirement for U.S. Appl. No. 14/303,080 mailed on Sep. 4, 2014, 6 pages.
Restriction Requirement for U.S. Appl. No. 14/302,179 mailed on Sep. 4, 2014, 6 pages.
Notice of Allowance for U.S. Appl. No. 14/303,080 mailed on Oct. 3, 2014, 9 pages.
Notice of Allowance for U.S. Appl. No. 14/302,179 mailed on Oct. 3, 2014, 9 pages.

\* cited by examiner

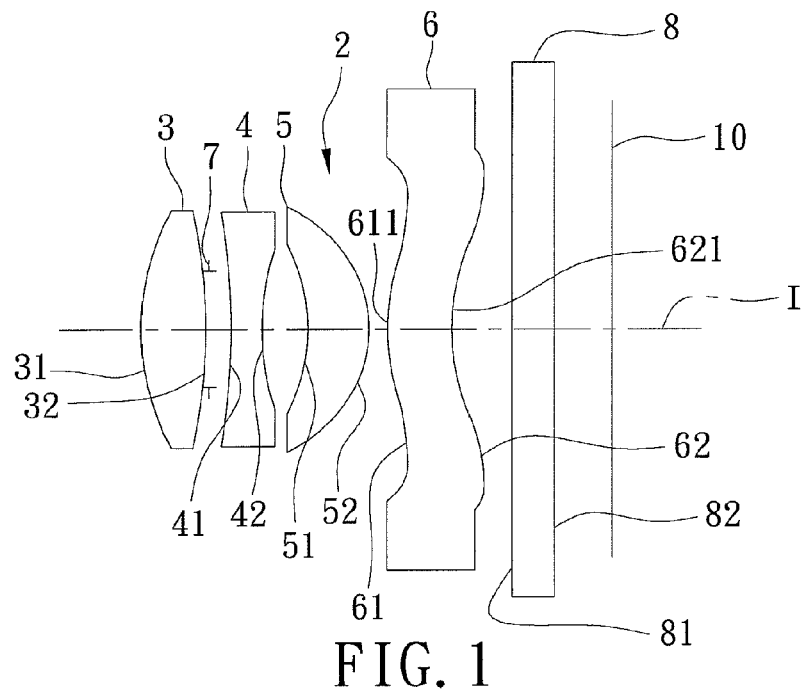
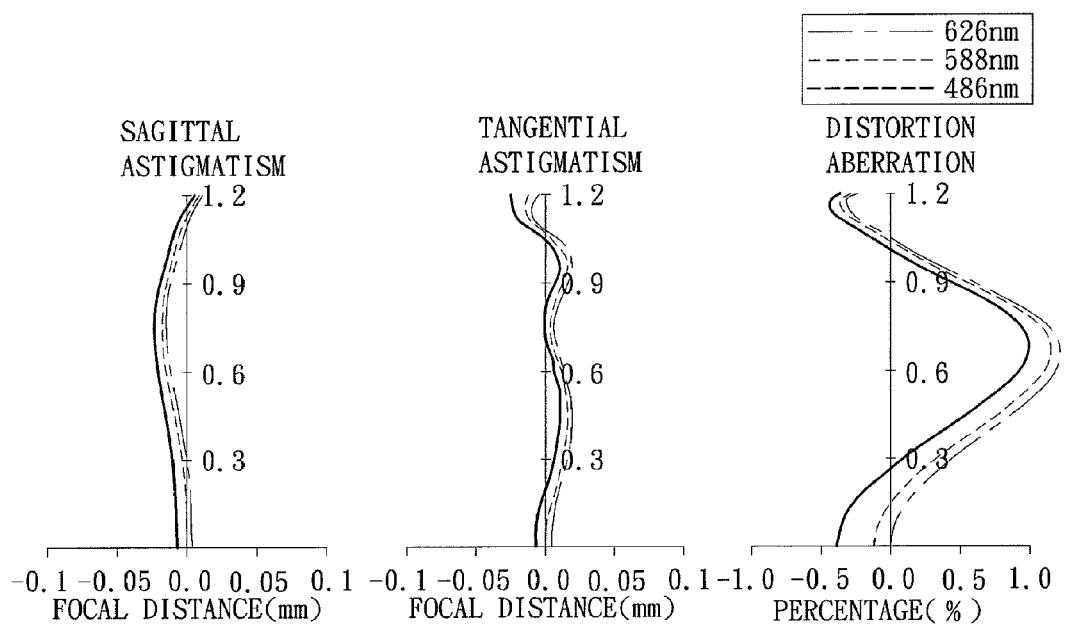
FIG. 2

IMAGING LENS

CROSS-REFERENCES TO RELATED APPLICATIONS

This application is a division of U.S. patent application Ser. No. 14/303,080, filed Jun. 12, 2014, which is a continuation of U.S. patent application Ser. No. 13/013,164, filed Jan. 25, 2011, which claims priority to Taiwanese Application No. 099130640, filed on Sep. 10, 2010, the disclosures of which are hereby incorporated by reference in their entirety for all purposes.

BACKGROUND OF THE INVENTION

1. Field of the Invention

The present invention relates to an imaging lens and an electronic apparatus having the same, more particularly to an imaging lens with four lens elements and to an electronic apparatus having the same.

2. Description of the Related Art

In recent years, various electronic devices are designed to include imaging lenses and image sensors for image-capturing and video-recording capabilities. To improve portability and imaging performances while reducing dimensions and weights of the electronic devices, different combinations of lenses are installed in the electronic devices.

U.S. Pat. No. 7,453,654 discloses an imaging lens with four lens elements of different optical characteristics, one of which is a spherical glass lens element while remaining three of which are plastic aspherical lens elements for enhancing image quality. However, the spherical glass lens element is difficult to fabricate due to its small dimensions and radius of curvature, and therefore has drawbacks such as high costs and weight.

Besides, although the spherical glass lens element is able to achieve a relatively high positive refracting power at a relatively small radius of curvature such that an overall length of the imaging lens may be significantly reduced, the spherical glass lens element is known to exhibit high chromatic aberration due to its low Abbe number.

U.S. Pat. No. 6,476,982 discloses an imaging lens with first and second lens elements thereof adhesively bonded to each other to thereby reduce chromatic aberration. Nevertheless, such an approach to reduce chromatic aberration requires a strong bonding between the first and second lens elements, which is often difficult to achieve especially if the first and second lens elements are made of different materials, e.g., glass and plastic, respectively. While the first and second lens elements may both be made of glass, costs and weight of the imaging lens will, as a result, be compromised.

U.S. Pat. No. 7,466,497 discloses an imaging lens with four plastic lens elements. Although the imaging lens has a relatively short overall focal length and maybe fabricated at a relatively low cost, the imaging lens is known to exhibit high chromatic aberration.

Therefore, the need for a low cost, low weight imaging lens that exhibits low chromatic aberration still exists in the market.

SUMMARY OF THE INVENTION

Therefore, an object of the present invention is to provide an imaging lens capable of alleviating the drawbacks of the aforesaid imaging lenses of the prior art.

Accordingly, an imaging lens of the present invention includes first, second, third, and fourth lens elements arranged in the given order from an object side to an imaging side.

The first lens element is made of plastic, has a positive focusing power, and is biconvex. The second lens element is made of plastic, has a negative focusing power, is biconcave, and has an abbe number not greater than 30. The third lens element is made of plastic, has a positive focusing power, and has a convex imaging-side surface facing toward the imaging side. The fourth lens element is made of plastic, and has an imaging-side surface facing toward the imaging side and formed with a concave area in a vicinity of an optical axis of the fourth lens element. The imaging lens further includes an aperture stop disposed between the first and second lens elements.

Another object of the present invention is to provide an electronic apparatus having an imaging module.

Accordingly, an electronic apparatus of the present invention includes a housing and an imaging module that is disposed in the housing. The imaging module includes an imaging lens having an object side and an imaging side, and an image sensor disposed at the imaging side.

The imaging lens includes first, second, third, and fourth lens elements arranged in the given order from the object side to the imaging side. The first lens element is made of plastic, has a positive focusing power, and is biconvex. The second lens element is made of plastic, has a negative focusing power, is biconcave, and has an abbe number not greater than 30. The third lens element is made of plastic, has a positive focusing power, and has a convex imaging-side surface facing toward the imaging side. The fourth lens element is made of plastic, and has an imaging-side surface facing toward the imaging side and formed with a concave area in a vicinity of an optical axis of the fourth lens element. The imaging lens further includes an aperture stop disposed between the first and second lens elements.

BRIEF DESCRIPTION OF THE DRAWINGS

Other features and advantages of the present invention will become apparent in the following detailed description of the preferred embodiments with reference to the accompanying drawings, of which:

FIG. 1 is a schematic diagram illustrating the first preferred embodiment of an imaging lens according to the present invention;

FIG. 2 illustrates plots of sagittal astigmatism, tangential astigmatism, and distortion aberrations of the imaging lens of the first preferred embodiment;

DETAILED DESCRIPTION OF THE INVENTION

Figure 3:
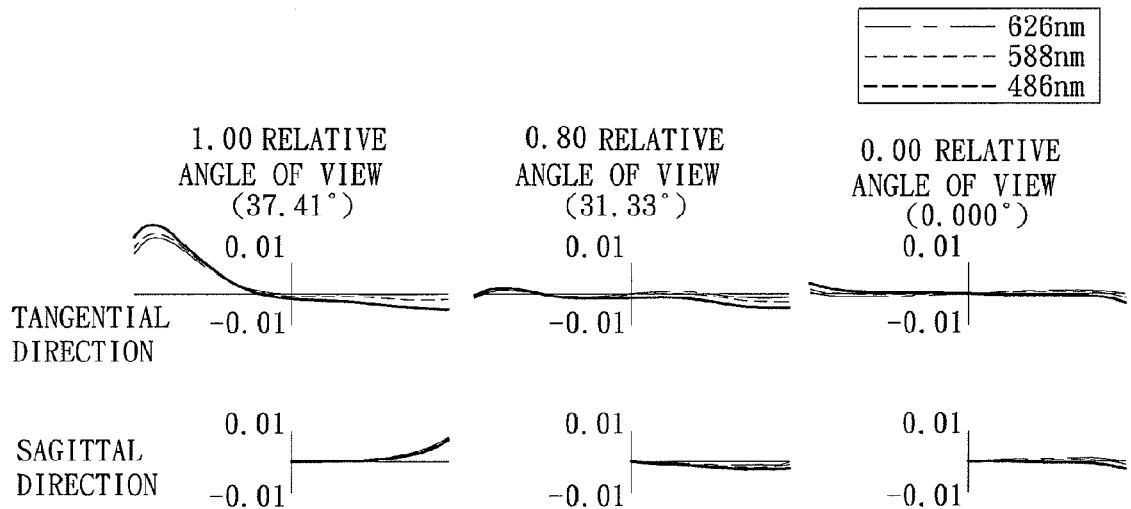
FIG. 3 illustrates ray fan plots of the imaging lens of the first preferred embodiment at different angles of view.

Before the present invention is described in greater detail, it should be noted that like elements are denoted by the same reference numerals throughout the disclosure.

Referring to FIG. 1, the first preferred embodiment of an imaging lens 2 of the present invention includes a first lens element 3, an aperture stop 7, a second lens element 4, a third lens element 5, a fourth lens element 6, and an optical filter 8 arranged in the given order from an object side to an imaging side. Each of the first, second, third, and fourth lens elements 3, 4, 5, 6 is made of plastic, and has an object-side surface 31, 41, 51, 61 and an imaging-side surface 32, 42, 52, 62. The first and second lens elements 3, 4 have a gap with a width preferably not narrower than 0.08 mm formed therebetween. When light enters the imaging lens 2, it travels through the first lens element 3, the aperture stop 7, the second lens element 4, the third lens element 5, the fourth lens element 6, and the optical filter 8 in the given order, and eventually forms an image at an imaging plane 10 disposed at the imaging side.

The first lens element 3 is a biconvex lens element with a positive focusing power (i.e., a positive diopter or a positive refracting power). The second lens element 4 is a biconcave lens element with a negative focusing power, and has an abbe number not greater than 30. The third lens element 5 has a positive focusing power, and the object-side surface 51 and the imaging-side surface 52 thereof are a concave surface and a convex surface, respectively. The fourth lens element 6 has a negative focusing power, the object-side surface 61 thereof is a wavelike surface having a convex area 611 in a vicinity of an optical axis (I) of the fourth lens element 6, and the imaging-side surface 62 thereof is a wavelike surface having a concave area 621 in the vicinity of the optical axis (I) of the fourth lens element 6. The aperture stop 7 is disposed between the first and second lens elements 3, 4, and is disposed on the imaging-side surface 32 of the first lens element 3 in this embodiment. The optical filter 8 is a flat glass panel, and has an object-side surface 81 facing toward the object side, and an imaging-side surface 82 facing toward the imaging side and parallel to the object-side surface 81.

Table 1 shows optical parameters of the lens elements 3-6, the optical filter 8, and the imaging plane 10.

TABLE 1

|  | Surface | Radius of Curvature (mm) | Thickness (mm) | Refractive Index | Abbe Number |
|---|---|---|---|---|---|
| First Lens element 3 | 31 | 1.142 | 0.300 | 1.544 | 56.12 |
|  | 32 | −3.234 | 0.086 |  |  |

TABLE 1-continued

|  | Surface | Radius of Curvature (mm) | Thickness (mm) | Refractive Index | Abbe Number |
|---|---|---|---|---|---|
| Second lens element 4 | 41 | −6.872 | 0.200 | 1.607 | 27.00 |
|  | 42 | 1.988 | 0.200 |  |  |
| Third Lens element 5 | 51 | −1.340 | 0.315 | 1.531 | 56.00 |
|  | 52 | −0.633 | 0.080 |  |  |
| Fourth Lens element 6 | 61 | 0.933 | 0.300 | 1.531 | 56.00 |
|  | 62 | 0.671 | 0.313 |  |  |
| Optical filter 8 | 81 | ∞ | 0.210 | 1.517 | 64.00 |
|  | 82 | ∞ | 0.288 |  |  |
| Imaging plane 10 | — | ∞ | −0.004 | — | — |

The object-side surfaces 31, 41, 51, 61 and the imaging-side surfaces 32, 42, 52, 62 are aspherical surfaces, and may be defined by the following equation (1):

$$Z(X) = \frac{x^2/r}{1+\sqrt{1-(1+K)\frac{x^2}{r^2}}} + AX^4 + BX^6 + CX^8 + DX^{10} + EX^{12} + FX^{14} \quad (1)$$

wherein (Z) represents an axis extending along the optical axis (I), (X) represents an axis extending perpendicular to the optical axis (I), and (r) is the radius of curvature (see Table 1). Moreover, Tables 2, 3 and 4 show conic constants (K), and higher-order aspherical surface coefficients (A), (B), (C), (D), (E), (F) of the object-side surfaces 31, 41, 51, 61 and the imaging-side surfaces 32, 42, 52, 62.

TABLE 2

| Surface | K | A | B |
|---|---|---|---|
| 31 | −1.8593E+00 | 0.0000E+00 | 2.2558E−02 |
| 32 | 2.5855E+01 | 0.0000E+00 | 1.1308E+00 |
| 41 | 8.8402E+01 | 0.0000E+00 | 1.3501E+00 |
| 42 | 6.7216E+00 | 0.0000E+00 | 1.6877E−01 |
| 51 | 2.5264E+00 | 0.0000E+00 | −2.6674E−01 |
| 52 | −5.0546E−01 | 0.0000E+00 | −1.5400E−01 |
| 61 | 0.0000E+00 | −1.0100E+00 | 5.4318E−01 |
| 62 | −1.3578E+00 | −9.6118E−01 | 8.5293E−01 |

TABLE 3

| Surface | C | D | E |
|---|---|---|---|
| 31 | −1.1958E+00 | 0.0000E+00 | 0.0000E+00 |
| 32 | −7.3494E−01 | 0.0000E+00 | 0.0000E+00 |
| 41 | 0.0000E+00 | 0.0000E+00 | 0.0000E+00 |
| 42 | 0.0000E+00 | 0.0000E+00 | 0.0000E+00 |
| 51 | 0.0000E+00 | 0.0000E+00 | 0.0000E+00 |
| 52 | 0.0000E+00 | 0.0000E+00 | 0.0000E+00 |
| 61 | −1.2084E+00 | 2.6891E+00 | −2.1573E+00 |
| 62 | −5.9839E−01 | 4.0733E−01 | −3.0081E−01 |

TABLE 4

| Surface | E |
|---|---|
| 31 | 0.0000E+00 |
| 32 | 0.0000E+00 |

TABLE 4-continued

| Surface | E |
|---|---|
| 41 | 0.0000E+00 |
| 42 | 0.0000E+00 |
| 51 | 0.0000E+00 |
| 52 | 0.0000E+00 |
| 61 | 0.0000E+00 |
| 62 | 0.069492928 |

Shown in FIG. 2 from left to right are plots of sagittal astigmatism (along a sagittal plane with respect to the imaging plane 10), tangential astigmatism (along a tangential plane with respect to the imaging plane 10), and distortion aberrations of the imaging lens 2 of the first preferred embodiment at three representative wavelengths (626 nm, 588 nm, and 486 nm). As shown in the plots of sagittal and tangential astigmatisms, the imaging lens 2 has a range of focal distances not exceeding ±0.05 mm within the whole angle of view at each of the representative wavelengths. Furthermore, in each of the plots of sagittal and tangential astigmatisms, curves that respectively represent the three representative wavelengths are relatively similar, which indicates that the imaging lens 2 of the first preferred embodiment exhibits relatively low chromatic aberration. Moreover, the distortion aberrations that occur in the imaging lens 2 of the first preferred embodiment have a range within ±0.3%. Therefore, the imaging lens 2 of the first preferred embodiment of the present invention has significant improvement over the prior art in terms of optical performance. FIG. 3 illustrates ray fan plots of the imaging lens 2 of the first preferred embodiment at normalized half-angles of view of 1, 0.8, and 0, which correspond to relative angles of view of 37.41°, 31.33°, and 0°, respectively. It is apparent that the imaging lens 2 is able to achieve low optical aberrations, and an angle of view of 74.82 .degree., which is wider than those generally achievable by conventional imaging lenses of the prior art.

Figure 4:
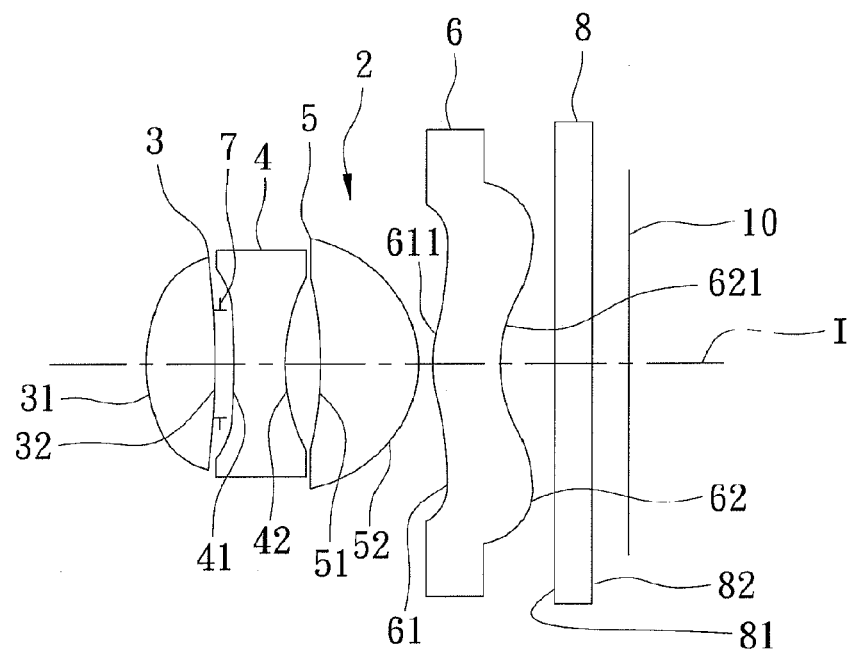
FIG. 4 is a schematic diagram illustrating the second preferred embodiment of an imaging lens according to the present invention.

Referring to FIG. 4, the second preferred embodiment of this invention has a configuration almost identical to that of the first preferred embodiment. The first lens element 3 is a biconvex lens element. The second lens element 4 is a biconcave lens element. The object-side surface 51 and the imaging-side surface 52 of the third lens element 5 are a concave surface and a convex surface, respectively. The object-side surface 61 of the fourth lens element 6 is a wavelike surface having a convex area 611 in the vicinity of the optical axis (I) of the fourth lens element 6, and the imaging-side surface 62 of the same is a wavelike surface having a concave area 621 in the vicinity of the optical axis (I) of the fourth lens element 6. The aperture stop 7 is disposed between the first and second lens elements 3, 4, and is disposed on the imaging-side surface 32 of the first lens element 3 in this invention.

Table 5 shows optical parameters of the lens elements 3-6, the optical filter 8, and the imaging plane 10 in the second preferred embodiment.

TABLE 5

| | Surface | Radius of Curvature (mm) | Thickness (mm) | Refractive Index | Abbe Number |
|---|---|---|---|---|---|
| First Lens element 3 | 31 | 1.039 | 0.333 | 1.544 | 56.12 |
| | 32 | −21.301 | 0.167 | | |
| Second lens element 4 | 41 | −36.891 | 0.300 | 1.607 | 27.00 |
| | 42 | 1.328 | 0.191 | | |

TABLE 5-continued

| | Surface | Radius of Curvature (mm) | Thickness (mm) | Refractive Index | Abbe Number |
|---|---|---|---|---|---|
| Third Lens element 5 | 51 | −3.560 | 0.573 | 1.531 | 56.00 |
| | 52 | −0.797 | 0.080 | | |
| Fourth Lens element 6 | 61 | 1.003 | 0.385 | 1.531 | 56.00 |
| | 62 | 0.680 | 0.313 | | |
| Optical filter 8 | 81 | ∞ | 0.210 | 1.517 | 64.00 |
| | 82 | ∞ | 0.218 | | |
| Imaging plane 10 | — | ∞ | −0.006 | — | — |

In the second preferred embodiment, the object-side surfaces 31, 41, 51, 61 and the imaging-side surfaces 32, 42, 52, 62 are aspherical surfaces and may be defined by the aforementioned equation (1). Tables 6 and 7 show conic constants (K), and higher-order aspherical surface coefficients (A), (B), (C), (D), (E) of the object-side surfaces 31, 41, 51, 61 and the imaging-side surfaces 32, 42, 52, 62. It is to be noted that, in this embodiment, the higher-order aspherical surface coefficient (F) of the object-side surfaces 31, 41, 51, 61 and the imaging-side surfaces 32, 42, 52, 62 has a value of "0", and hence is omitted from Tables 6 and 7.

TABLE 6

| Surface | K | A | B |
|---|---|---|---|
| 31 | 1.2003E+00 | 0.0000E+00 | 7.7611E−02 |
| 32 | 0.0000E+00 | 3.0428E−01 | −3.7751E−01 |
| 41 | 0.0000E+00 | −1.3938E−01 | −1.2157E+00 |
| 42 | 1.8276E+00 | 0.0000E+00 | −1.0638E+00 |
| 51 | 0.0000E+00 | 2.5073E−01 | −1.4887E+00 |
| 52 | −1.3788E−02 | 0.0000E+00 | 1.1743E−01 |
| 61 | 0.0000E+00 | −9.3364E−01 | 4.8794E−01 |
| 62 | −9.0662E−01 | −1.0326E+00 | 8.2326E−01 |

TABLE 7

| Surface | C | D | E |
|---|---|---|---|
| 31 | −9.1967E−02 | 0.0000E+00 | 0.0000E+00 |
| 32 | 2.8013E−01 | 0.0000E+00 | 0.0000E+00 |
| 41 | −1.0664E+00 | 0.0000E+00 | 0.0000E+00 |
| 42 | 1.0191E+00 | 0.0000E+00 | 0.0000E+00 |
| 51 | 1.4743E+00 | 0.0000E+00 | 0.0000E+00 |
| 52 | −2.8925E−03 | 0.0000E+00 | 0.0000E+00 |
| 61 | −1.1042E+00 | 2.1865E+00 | −1.5911E+00 |
| 62 | −8.6586E−01 | 6.5005E−01 | −2.3789E−01 |

Figure 5:
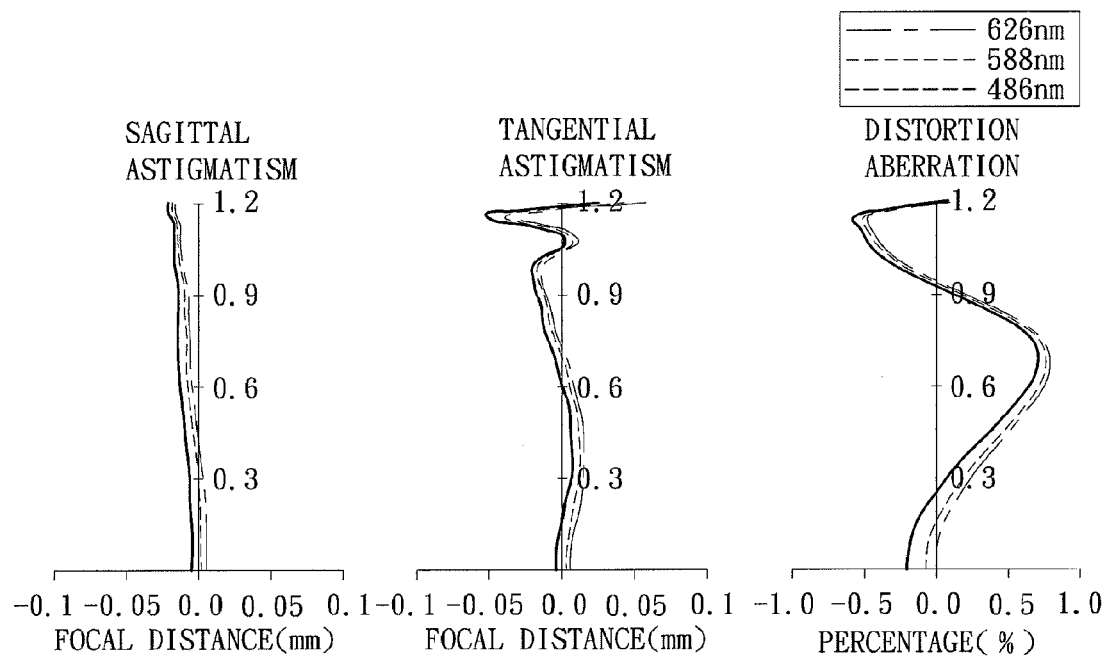
FIG. 5 illustrates plots of sagittal astigmatism, tangential astigmatism, and distortion aberrations of the imaging lens of the second preferred embodiment.

Shown in FIG. 5 from left to right are plots of sagittal astigmatism, tangential astigmatism, and distortion aberrations of the imaging lens 2 of the second preferred embodiment at the three representative wavelengths. As shown in the plots of sagittal and tangential astigmatisms, the imaging lens 2 has a range of focal distances not exceeding ±0.05 mm within the whole angle of view at each of the representative wavelengths. Moreover, the distortion aberrations that occur in the imaging lens 2 of the second preferred embodiment have a range within ±0.30.

Figure 6:
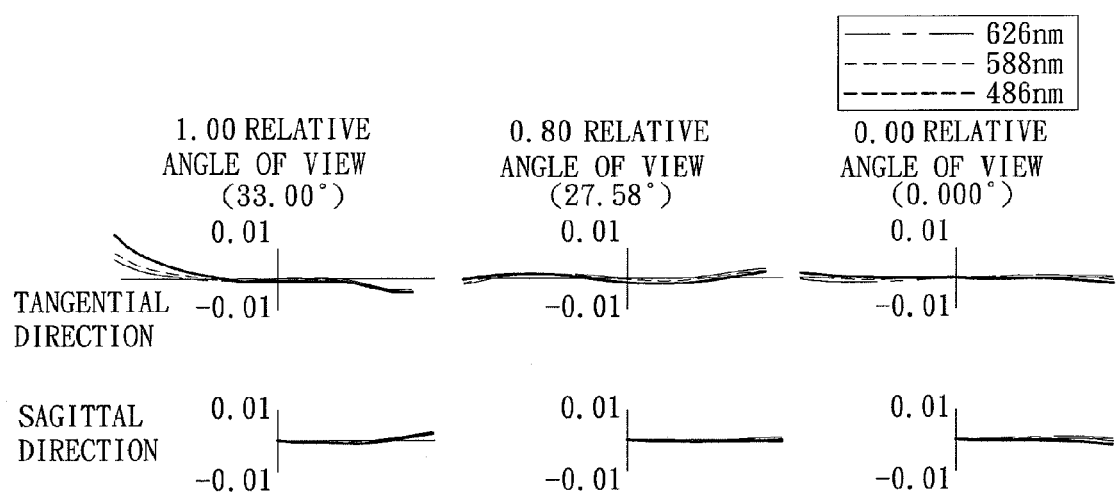
FIG. 6 illustrates ray fan plots of the imaging lens of the second preferred embodiment at different angles of view.

FIG. 6 illustrates ray fan plots of the imaging lens 2 of the second preferred embodiment at normalized half-angles of view of 1, 0.8, and 0, which correspond to relative angles of view of 33.00°, 27.58°, and 0°, respectively. It is apparent that the imaging lens 2 is able to achieve an angle of view of 66° and low optical aberrations.

Figure 7:
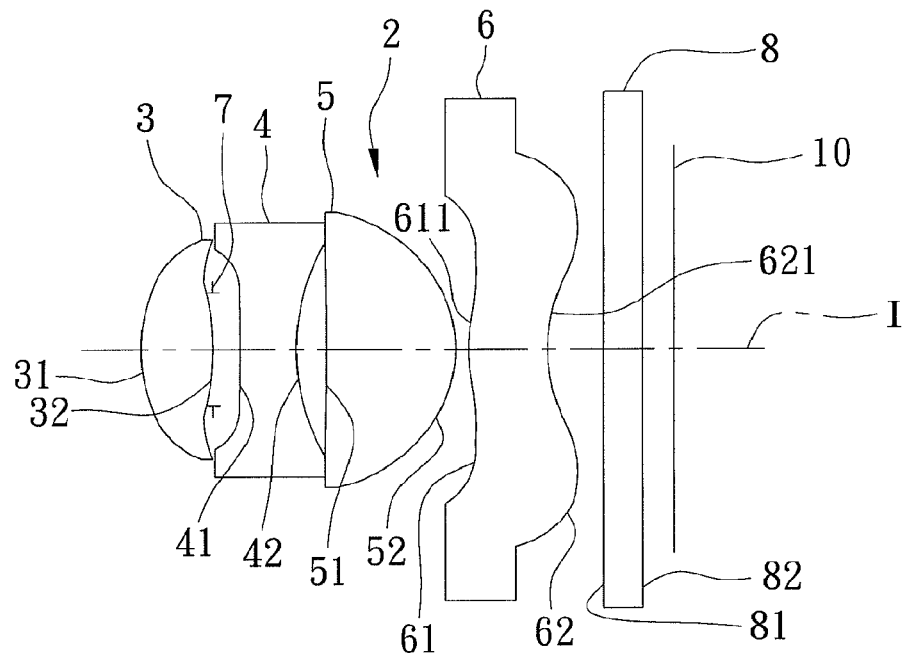
FIG. 7 is a schematic diagram illustrating the third preferred embodiment of an imaging lens according to the present invention.

Referring to FIG. 7, the third preferred embodiment of this invention has a configuration almost identical to that of the first preferred embodiment. The first lens element 3 is a biconvex lens element. The second lens element 4 is a biconcave lens element. The object-side surface 51 and the imaging-side surface 52 of the third lens element 5 are a concave surface and a convex surface, respectively. The object-side surface 61 of the fourth lens element 6 is a wavelike surface having a convex area 611 in the vicinity of the optical axis (I) of the fourth lens element 6, and the imaging-side surface 62 of the same is a wavelike surface having a concave area 621 in the vicinity of the optical axis (I) of the fourth lens element 6. The aperture stop 7 is disposed between the first and second lens elements 3, 4, and is disposed on the imaging-side surface 32 of the first lens element 3 of this invention.

Table 8 shows optical parameters of the lens elements 3-6, the optical filter 8, and the imaging plane 10 in the third preferred embodiment.

TABLE 8

| | Surface | Radius of Curvature (mm) | Thickness (mm) | Refractive Index | Abbe Number |
|---|---|---|---|---|---|
| First Lens element 3 | 31 | 1.065 | 0.332 | 1.531 | 56.00 |
| | 32 | −30.651 | 0.200 | | |
| Second lens element 4 | 41 | −30.653 | 0.3000 | 1.607 | 27.00 |
| | 42 | 1.217 | 0.1535 | | |
| Third Lens element 5 | 51 | −673.972 | 0.697 | 1.531 | 56.00 |
| | 52 | −0.697 | 0.080 | | |
| Fourth Lens element 6 | 61 | 1.450 | 0.418 | 1.531 | 56.00 |
| | 62 | 0.648 | 0.313 | | |
| Optical filter 8 | 81 | ∞ | 0.210 | 1.517 | 64.00 |
| | 82 | ∞ | 0.167 | | |
| Imaging plane 10 | — | ∞ | −0.001 | — | — |

In the third preferred embodiment, the object-side surfaces 31, 41, 51, 61 and the imaging-side surfaces 32, 42, 52, 62 are aspherical surfaces and may be defined by the aforementioned equation (1). Tables 9 and 10 show conic constants (K), and higher-order aspherical surface coefficients (A), (B), (C), (D), (E) of the object-side surfaces 31, 41, 51, 61 and the imaging-side surfaces 32, 42, 52, 62. It is to be noted that, in this embodiment, the higher-order aspherical surface coefficient (F) of each of the object-side surfaces 31, 41, 51, 61 and the imaging-side surfaces 32, 42, 52, 62 has a value of "0", and hence is omitted from Tables 9 and 10.

TABLE 9

| Surface | K | A | B |
|---|---|---|---|
| 31 | 1.5909E+00 | 0.0000E+00 | 5.5339E−02 |
| 32 | 0.0000E+00 | 3.3553E−01 | −3.2334E−01 |
| 41 | 0.0000E+00 | −2.9897E−01 | −7.5085E−01 |
| 42 | −8.3854E−01 | 0.0000E+00 | −6.2382E−01 |
| 51 | 0.0000E+00 | 7.4113E−02 | −6.7356E−01 |
| 52 | −3.9205E−01 | 0.0000E+00 | 3.5454E−01 |
| 61 | 0.0000E+00 | −1.0339E+00 | 8.4838E−01 |
| 62 | −1.2092E+00 | −1.2526E+00 | 1.4408E+00 |

TABLE 10

| Surface | C | D | E |
|---|---|---|---|
| 31 | −1.2377E−01 | 0.0000E+00 | 0.0000E+00 |
| 32 | 7.1020E−01 | 0.0000E+00 | 0.0000E+00 |
| 41 | −3.6288E+00 | 0.0000E+00 | 0.0000E+00 |
| 42 | 6.5857E−01 | 0.0000E+00 | 0.0000E+00 |
| 51 | 1.1019E+00 | 0.0000E+00 | 0.0000E+00 |
| 52 | −3.9701E−01 | 0.0000E+00 | 0.0000E+00 |
| 61 | −5.9630E−01 | 1.0278E+00 | −1.0836E+00 |
| 62 | 1.2621E+00 | 6.2777E−01 | −1.6493E−01 |

Figure 8:
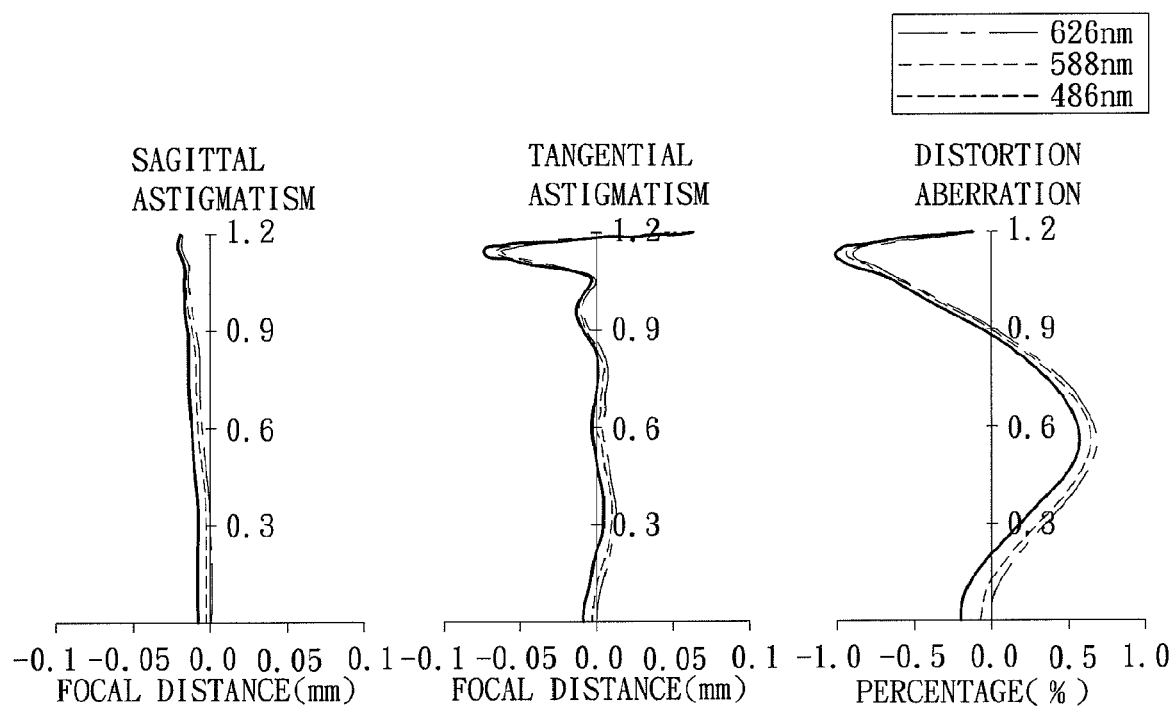
FIG. 8 illustrates plots of sagittal astigmatism, tangential astigmatism, and distortion aberrations of the imaging lens of the third preferred embodiment.
Figure 9:
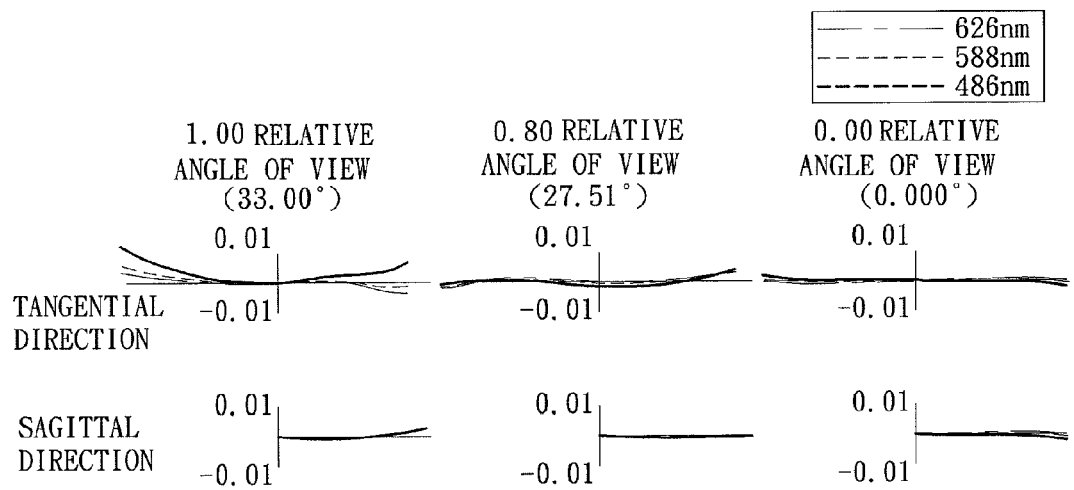
FIG. 9 illustrates ray fan plots of the imaging lens of the third preferred embodiment at different angles of view.

Shown in FIG. 8 from left to right are plots of sagittal astigmatism, tangential astigmatism, and distortion aberrations of the imaging lens 2 of the third preferred embodiment at the three representative wavelengths. FIG. 9 illustrates ray fan plots of the imaging lens 2 of the third preferred embodiment at normalized half-angles of view of 1, 0.8, and 0, which correspond to relative angles of view of 33.00°, 27.51°, and 0°, respectively. It is apparent that the imaging lens 2 is able to achieve an angle of view of 66° and low optical aberrations.

Figure 10:
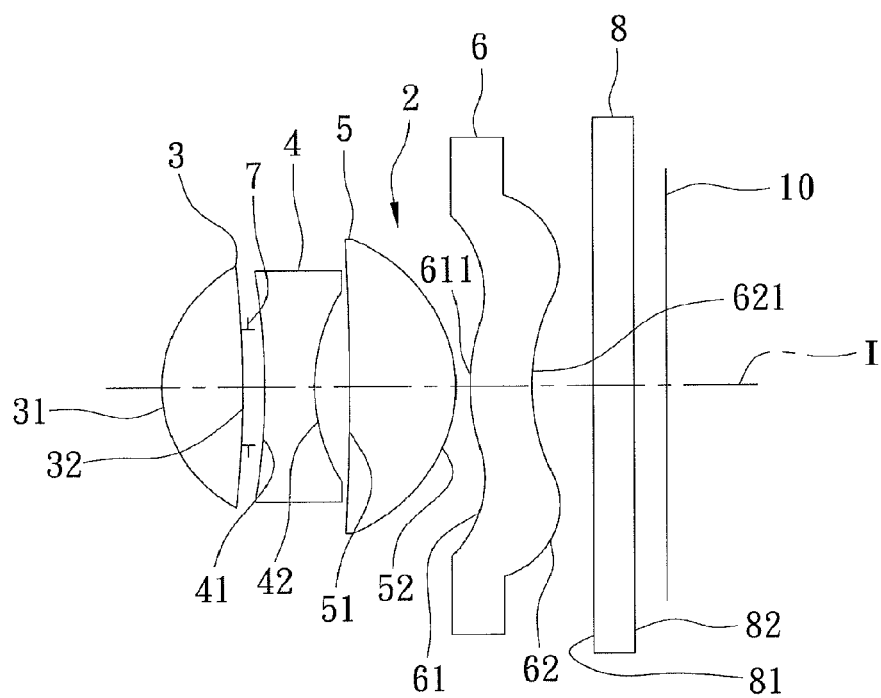
FIG. 10 is a schematic diagram illustrating the fourth preferred embodiment of an imaging lens according to the present invention.

Referring to FIG. 10, the fourth preferred embodiment of this invention has a configuration almost identical to that of the first preferred embodiment. The first lens element 3 is a biconvex lens element. The second lens element 4 is a biconcave lens element. The object-side surface 51 and the imaging-side surface 52 of the third lens element 5 are a concave surface and a convex surface, respectively. The object-side surface 61 of the fourth lens element 6 is a wavelike surface having a convex area 611 in the vicinity of the optical axis (I) of the fourth lens element 6, and the imaging-side surface 62 of the same is a wavelike surface having a concave area 621 in the vicinity of the optical axis (I) of the fourth lens element 6. The aperture stop 7 is disposed between the first and second lens elements 3, 4, and is disposed on the imaging-side surface 32 of the first lens element 3 in this embodiment.

Table 11 shows optical parameters of the lens elements 3-6, the optical filter 8, and the imaging plane 10 in the fourth preferred embodiment.

TABLE 11

| | Surface | Radius of Curvature (mm) | Thickness (mm) | Refractive Index | Abbe Number |
|---|---|---|---|---|---|
| First Lens element 3 | 31 | 0.942 | 0.357 | 1.544 | 56.12 |
| | 32 | −5.700 | 0.107 | | |
| Second lens element 4 | 41 | −16.250 | 0.300 | 1.607 | 27.00 |
| | 42 | 1.129 | 0.188 | | |
| Third Lens element 5 | 51 | −18.518 | 0.525 | 1.531 | 56.00 |
| | 52 | −1.076 | 0.080 | | |
| Fourth Lens element 6 | 61 | 0.972 | 0.310 | 1.531 | 56.00 |
| | 62 | 0.723 | 0.313 | | |
| Optical filter 8 | 81 | ∞ | 0.210 | 1.517 | 64.00 |
| | 82 | ∞ | 0.185 | | |
| Imaging plane 10 | — | ∞ | −0.022 | — | — |

In the fourth preferred embodiment, the object-side surfaces 31, 41, 51, 61 and the imaging-side surfaces 32, 42, 52, 62 are aspherical surfaces and may be defined by the aforementioned equation (1). Tables 12 and 13 show conic constants (K), and higher-order aspherical surface coefficients (A), (B), (C), (D), (E) of the object-side surfaces 31, 41, 51, 61 and the imaging-side surfaces 32, 42, 52, 62. It is to be noted that, in this embodiment, the higher-order aspherical surface coefficient (F) of each of the object-side surfaces 31, 41, 51, 61 and the imaging-side surfaces 32, 42, 52, 62 has a value of "0", and hence is omitted from Tables 12 and 13.

TABLE 12

| Surface | K | A | B |
|---|---|---|---|
| 31 | 6.6012E−01 | 0.0000E+00 | −4.1214E−02 |
| 32 | 0.0000E+00 | 4.6103E−01 | −5.0339E−01 |
| 41 | 0.0000E+00 | 1.9266E−01 | −1.5847E+00 |
| 42 | 1.7393E+00 | 0.0000E+00 | −1.2067E+00 |
| 51 | 0.0000E+00 | 5.0072E−01 | −2.9983E+00 |
| 52 | 3.4241E−02 | 0.0000E+00 | −4.5071E−01 |
| 61 | 0.0000E+00 | −1.1828E+00 | 4.6896E−01 |
| 62 | −1.4151E+00 | −1.1188E+00 | 1.1673E+00 |

TABLE 13

| Surface | C | D | E |
|---|---|---|---|
| 31 | 6.4481E−01 | 0.0000E+00 | 0.0000E+00 |
| 32 | −1.6260E−01 | 0.0000E+00 | 0.0000E+00 |
| 41 | −2.2720E−01 | 0.0000E+00 | 0.0000E+00 |
| 42 | 1.1741E+00 | 0.0000E+00 | 0.0000E+00 |
| 51 | 3.6965E+00 | 0.0000E+00 | 0.0000E+00 |
| 52 | −3.1569E−02 | 0.0000E+00 | 0.0000E+00 |
| 61 | −1.0668E+00 | 2.0910E+00 | −1.4669E+00 |
| 62 | −1.0752E+00 | 5.9753.E−01 | −1.8835E−01 |

Figure 11:
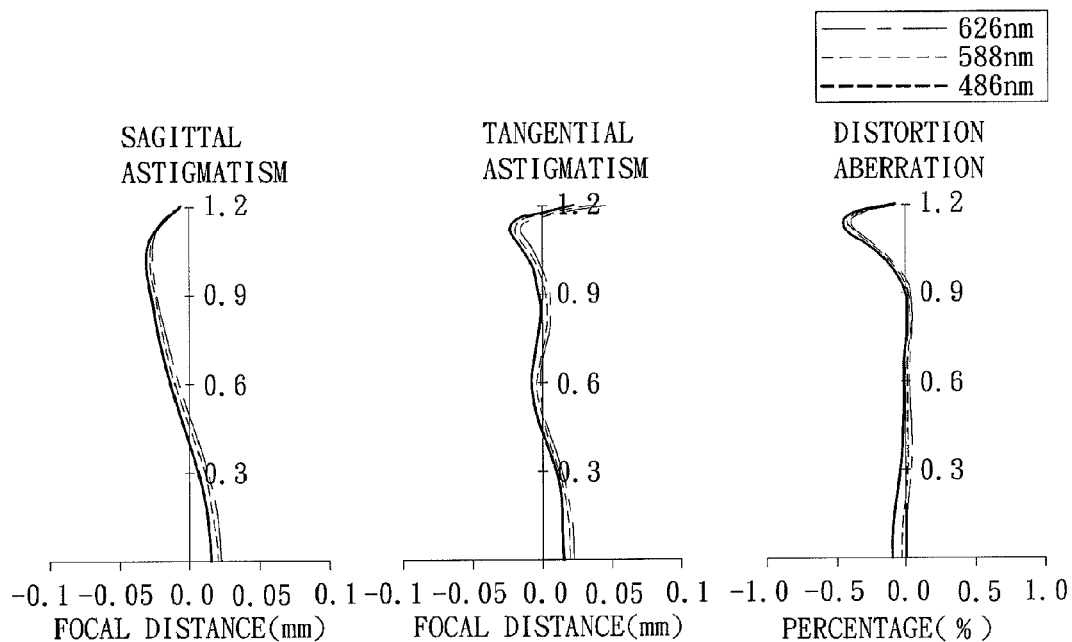
FIG. 11 illustrates plots of sagittal astigmatism, tangential astigmatism, and distortion aberrations of the imaging lens of the fourth preferred embodiment.
Figure 12:
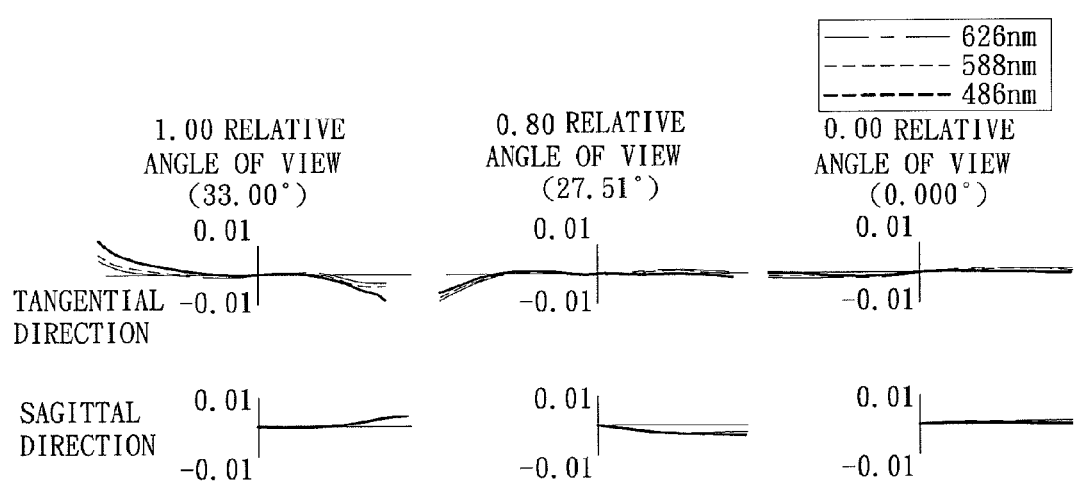
FIG. 12 illustrates ray fan plots of the imaging lens of the fourth preferred embodiment at different angles of view.

Shown in FIG. 11 from left to right are plots of sagittal astigmatism, tangential astigmatism, and distortion aberrations of the imaging lens 2 of the fourth preferred embodiment at the three representative wavelengths. FIG. 12 illustrates ray fan plots of the imaging lens 2 of the fourth preferred embodiment at normalized half-angles of view of 1, 0.8, and 0, which correspond to relative angles of view of 33.00°, 27.51°, and 0°, respectively. It is apparent that the imaging lens 2 is able to achieve an angle of view of 66° and low optical aberrations.

Table 14 shows optical parameters of the preferred embodiments for comparison.

TABLE 14

| | Imaging Height = 1.2 mm | | | |
|---|---|---|---|---|
| | Preferred Embodiment | | | |
| | 1 | 2 | 3 | 4 |
| F Number | 2.4 | 2.4 | 2.4 | 2.4 |
| Half-angle of view | 37.4 | 33.0 | 33.0 | 33.0 |
| f | 1.575 | 1.845 | 1.851 | 1.859 |
| TL | 2.288 | 2.764 | 2.868 | 2.553 |
| f1 | 1.598 | 1.841 | 1.955 | 1.522 |
| f2 | −2.544 | −2.127 | −1.941 | −1.745 |
| f3 | 1.966 | 1.183 | 1.320 | 2.140 |
| f4 | −7.457 | −6.806 | −2.704 | −9.374 |
| f12 | 3.187 | 4.656 | 6.584 | 3.753 |
| R21/f | −4.363 | −19.999 | −16.557 | −8.741 |
| R12/R21 | 0.471 | 0.577 | 1.000 | 0.351 |
| Wg | 0.086 | 0.167 | 0.200 | 0.107 |
| f1/f | 1.014 | 0.998 | 1.056 | 0.819 |
| TL/f | 1.453 | 1.498 | 1.549 | 1.373 |
| f12/f | 2.023 | 2.524 | 3.556 | 2.019 |

It is to be noted that the F number represents a ratio between a focal length of the imaging lens 2 and a diameter of an entrance pupil of the aperture stop 7, and $W_g$ represents the width of the gap between the first and second lens elements 3, 4.

The imaging lens 2 of each of the preferred embodiments satisfies optical conditions 2 to 6, which are described hereinafter.

Optical Condition 2:

$$-21 \leq R_{21}/f < 0 \qquad (2)$$

wherein $R_{21}$ represents a radius of curvature of the object-side surface 41 of the second lens element 4, and f represents the focal length of the imaging lens 2. The imaging lens 2 must satisfy optical condition 2 such that chromatic aberrations may be significantly reduced and stronger bonding between the imaging-side surface 32 of the first lens element 3 and the object-side surface 41 of the second lens element 4 may be ensured.

Optical Condition 3:

$$R_{12}/R_{21} \leq 1.1 \qquad (3)$$

wherein $R_{12}$ represents a radius of curvature of the imaging-side surface 32 of the first lens element 1. The imaging lens 2 must satisfy optical condition 3, and the gap between the first and second lens elements 3, 4 must have a width not narrower than 0.08 mm, so as to alleviate peripheral interference between the first and second lens elements 3, 4, which may influence the structural integrity of the imaging lens 2.

Optical Condition 4:

$$0.7 < f_1/f \leq 1.1 \qquad (4)$$

wherein $f_1$ represents a focal length of the first lens element 3.

If the value of $f_1/f$ is greater than 1.1, the positive focusing power of the first lens element 3 will be too low and must be compensated for by the other lens elements 4-6, which, as a consequence, will increase the overall length of the imaging lens 2. On the other hand, if the value of $f_1/f$ is not greater than 0.7, the positive focusing power of the first lens element 3 will be too high, causing the first lens element 3 to exhibit severe distortion aberration. Although the other lens element 4-6 may be configured to compensate for the low positive focusing power of the first lens element 3, the effect of which is rather limited since design of the imaging lens 2 is substantially based upon the first lens element 3.

Optical Condition 5:

$$TL/f < 1.55 \qquad (5)$$

wherein TL represents a distance between the object-side surface 31 of the first lens element 3 and the imaging plane 10. If the imaging lens 2 fails to satisfy optical condition 5, the overall length thereof will be too long, rendering it less applicable to miniaturized products.

Optical Condition 6:

$$1 < f_{12}/f < 4.5 \qquad (6)$$

wherein $f_{12}$ represents a combined focal length of the first and second lens elements 3, 4.

If the value of $f_{12}/f$ is not smaller than 4.5, the combined focal length of the first and second lens elements 3, 4 will be too long. That is to say, a combined positive focusing power of the first and second lens elements 3, 4 will be too low. Further, compensation by the other lens elements 5-6 will be insufficient to shorten the combined focal length significantly. If the value of $f_{12}/f$ is not larger than 1, the combined focal length of the first and second lens elements 3, 4 will be too short. That is to say, the combined positive focusing power of the first and second lens elements 3, 4 will be too high. As a result, the first and second lens elements 3, 4 in combination will exhibit high distortion aberration. Moreover, the effect of compensation by the other lens elements 5-6 will be rather limited.

Figure 13:
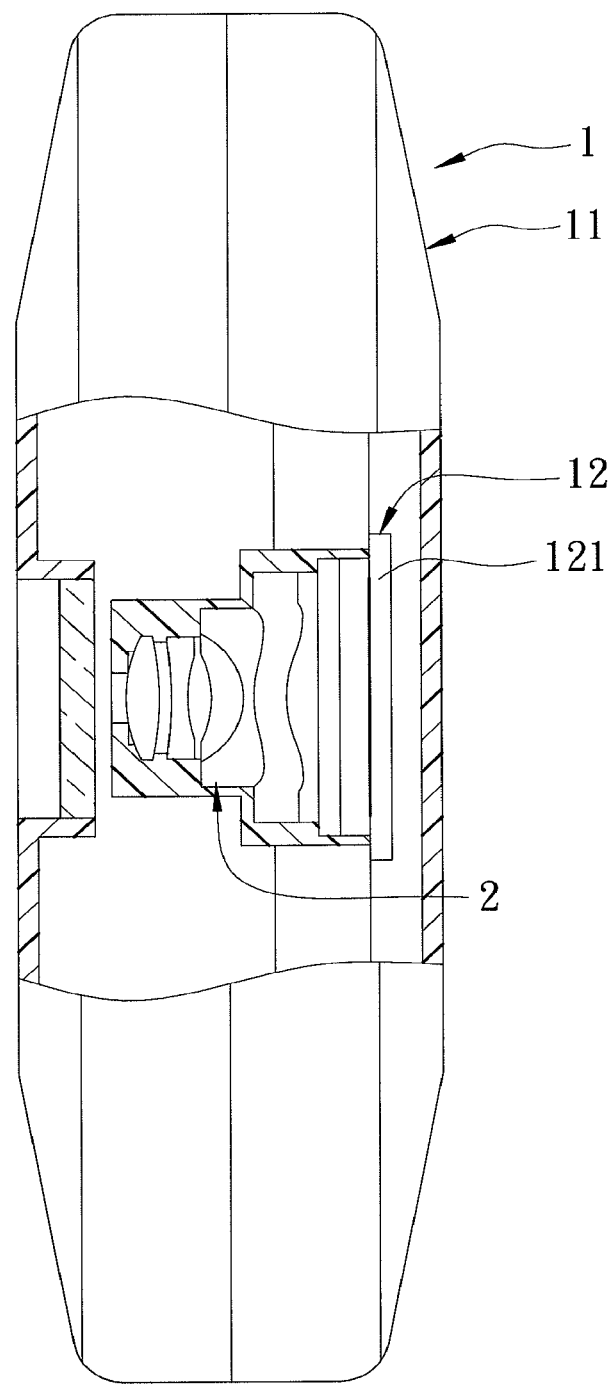
FIG. 13 is a schematic partly sectional view illustrating the preferred embodiment of an electronic apparatus, which includes a housing and an imaging module, according to the present invention.

Referring to FIG. 13, the preferred embodiment of an electronic apparatus 1 according to this invention includes a housing 11 and an imaging module 12 disposed in the housing 11. In this embodiment, the electronic apparatus 1 is exemplified as a mobile phone. However, in other embodiments, the electronic apparatus 1 may be implemented otherwise. The imaging module 12 includes the imaging lens 2 of the first preferred embodiment, and an image sensor 121 disposed at the imaging plane 10.

In summary, the imaging lenses 2 of the preferred embodiments have relatively low sagittal and tangential astigmatisms, distortion aberrations, and chromatic aberrations, and have a relatively wide angle of view.

Furthermore, the first, second, third, and fourth lens elements 3-6 are made of plastic and hence have low weights and may be fabricated at lower costs.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical imaging lens comprising, from an object side to an image side:
   a first lens element;
   a second lens element;
   a third lens element; and
   a fourth lens element, wherein each of the first lens element, the second lens element, the third lens element, and the fourth lens element have an object-side surface facing toward the object side and an image-side surface facing toward the image side, wherein:
   the first lens element has a positive refracting power, the object-side surface of the first lens element has a convex portion in a vicinity of an optical axis and a convex portion near a circumference of the first lens element, and the image-side surface of the first lens element has a convex portion in a vicinity of the optical axis and a convex portion near the circumference of the first lens element;
   the second lens element has a negative refracting power, the object-side surface of the second lens element has a concave portion in a vicinity of the optical axis and a concave portion near a circumference of the second lens element, and the image-side surface of the second lens element has a concave portion in a vicinity of the optical axis;
   the third lens element has a positive refracting power, the object-side surface of the third lens element has a concave portion in a vicinity of the optical axis, and the image-side surface of the third lens element has a convex portion in a vicinity of the optical axis;
   the fourth lens element has a negative refracting power and the image-side surface of the fourth lens element has a concave portion in a vicinity of the optical axis and a convex portion near a circumference of the fourth lens element;
   the optical imaging lens has only four lens elements having a refracting power; and
   the optical imaging lens satisfies the following relations: $0.430 \leq AG12/AG23 \leq 1.303$, wherein AG12 is a width of an air gap between the first and second lens elements along the optical axis and AG23 is a width of an air gap between the second and third lens elements along the optical axis.

2. The optical imaging lens of claim 1 wherein a ratio T1/T3 is between 0.476 and 0.952, wherein T1 is a thickness of the first lens element along the optical axis and T3 is a thickness of the third lens element along the optical axis.

3. The optical imaging lens of claim 1 wherein a ratio T1/AG12 is between 1.660 and 3.488, wherein T1 is a thickness of the first lens element along the optical axis.

4. The optical imaging lens of claim 1, wherein a ratio T3/AG34 is between 3.938 and 8.713, wherein T3 is a thickness of the third lens element along the optical axis and AG34 is a width of an air gap between the third and fourth lens elements along the optical axis.

* * * * *